United States Patent [19]

Hurd

[11] Patent Number: 4,671,708

[45] Date of Patent: Jun. 9, 1987

[54] DEBRIS COLLECTOR AND COOLER

[76] Inventor: James Hurd, 1118 W. Spruce Ave., Yakima, Wash. 98902

[21] Appl. No.: 821,350

[22] Filed: Jan. 22, 1986

[51] Int. Cl.⁴ .............................................. B65G 53/42
[52] U.S. Cl. ...................................... 406/108; 15/345; 239/120; 239/289; 406/152
[58] Field of Search ............... 406/108, 151, 152, 194, 406/93; 239/103, 120, 289; 15/345

[56] References Cited

U.S. PATENT DOCUMENTS

| | | | |
|---|---|---|---|
| 52,309 | 1/1866 | Moses | 406/108 X |
| 1,444,921 | 2/1923 | Hunter | 406/108 |
| 1,524,070 | 1/1925 | West | 406/108 |
| 2,316,476 | 4/1943 | Walpole . | |
| 2,499,582 | 3/1950 | Harrison . | |
| 2,744,286 | 5/1956 | Carpenter et al. | 406/152 X |
| 3,126,021 | 3/1964 | May . | |
| 3,287,755 | 11/1966 | Pansini | 15/345 X |
| 3,545,029 | 12/1970 | Walmsley et al. . | |
| 3,808,750 | 5/1974 | Mann . | |
| 3,994,042 | 11/1976 | Zakis . | |
| 4,409,699 | 10/1983 | Moorhouse . | |
| 4,499,713 | 2/1985 | Stone | 15/345 X |

FOREIGN PATENT DOCUMENTS 6502158  8/1966  Netherlands ................. 406/152

Primary Examiner—Andres Kashnikow
Assistant Examiner—Daniel R. Edelbrock
Attorney, Agent, or Firm—Gifford, Groh, VanOphem, Sheridan, Sprinkle & Dolgorukov

[57] ABSTRACT

A device for collecting debris from a grinding, polishing, or other work removal operation and for simultaneously cooling the work. A scoop is open at one end and has side walls which taper towards a base. An outlet in the base is connected by a fluid conduit to a debris collection container. A pressurized gas nozzle is mounted to the scoop and has its outlet spaced from the open end of the scoop and directed towards the base of the scoop. During a grinding operation or the like carried out between the nozzle and the open end of the scoop, the gas flow from the nozzle directs debris from the grinding operation to the base outlet, through the conduit and into the debris collection container. A vacuum source is optionally used at the debris collection container to induct debris through the fluid conduit and to the debris collection container. The gas flow from the nozzle also cools the work so that the work can be comfortably handled.

7 Claims, 2 Drawing Figures

DEBRIS COLLECTOR AND COOLER

BACKGROUND OF THE INVENTION

I. Field of the Invention

The present invention relates generally to debris collectors, and more particularly, to a debris collector employed during a grinding or other material removal operation and which simultaneously cools the work.

I. Description of the Prior Art

In dental laboratories, jewelry shops and the like, appliances are typically ground and/or polished by using portable rotary grinders which are typically electrically powered. Such grinding operations create a relatively large amount of dust and debris which must be removed from the work area in one fashion or another. This is particularly true where the debris includes precious metals, such as silver and gold, where reclamation of the precious metals is highly desireable in view of their high cost.

There have been a number of previously known suction devices which have a suction scoop positioned closely adjacent the dental appliance which is being ground or polished. In theory, the suction device inducts the debris from the grinding or polishing operation and removes this debris to a debris collection container.

These previously known suction devices, however, have not proven entirely effective in use. In practice, these previously known suction devices remove only a portion of the debris which is formed during the grinding operation. The remainder of the debris collects on the work table, floor and the like in the area surrounding the grinding operation and must be subsequently manually removed. This not only is inconvenient and time consuming for the dental technician, but also results in the loss of precious metals. Furthermore, airborne dust and debris creates an undesirable and unhealthy breathing environment for the dental technician.

A still further disadvantage of these previously known suction devices is that the work becomes hot when polished or ground thus rendering it uncomfortable for the technician to hold in his or her hands.

SUMMARY OF THE PRESENT INVENTION

The present invention presents a dust and debris (hereinafter collectively referred to as debris) collection device and work cooling device particularly suitable for a material removal operation, such as grinding or polishing, which overcomes all of the above-mentioned disadvantages of the previously known devices.

In brief, the device of the present invention comprises a scoop having a base and walls which extend outwardly from one side of the base and form a scoop chamber. The ends of the walls opposite from the base are open and, preferably, the walls taper inwardly towards each other from their open ends and towards the base.

The base includes a fluid outlet and a debris collection container which is fluidly connected to the base outlet by a fluid conduit. A suction device is preferably operatively coupled with the debris collection container to create gas flow from the base outlet, through the fluid conduit and to the debris collection container so that debris entering the base outlet is inducted through the fluid conduit and to the container.

A pressurized gas nozzle has its inlet connected to a source of pressurized gas, such as compressed air, compressed nitrogen or compressed oxygen. The nozzle is mounted to the scoop so that the nozzle outlet is spaced from the open end of the scoop and is directed towards the base outlet. Thus, when the work which is being ground, polished or the like is positioned between the nozzle and the open end of the scoop, pressurized gas flow from the nozzle forces the debris into the scoop and through the base outlet. The pressurized gas flow simultaneously cools the work so that it is more comfortable to handle. The gas flow through the fluid conduit and the suction device further enhances the removal of the debris to the collection container.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF A PRESENT INVENTION

Figure 1:
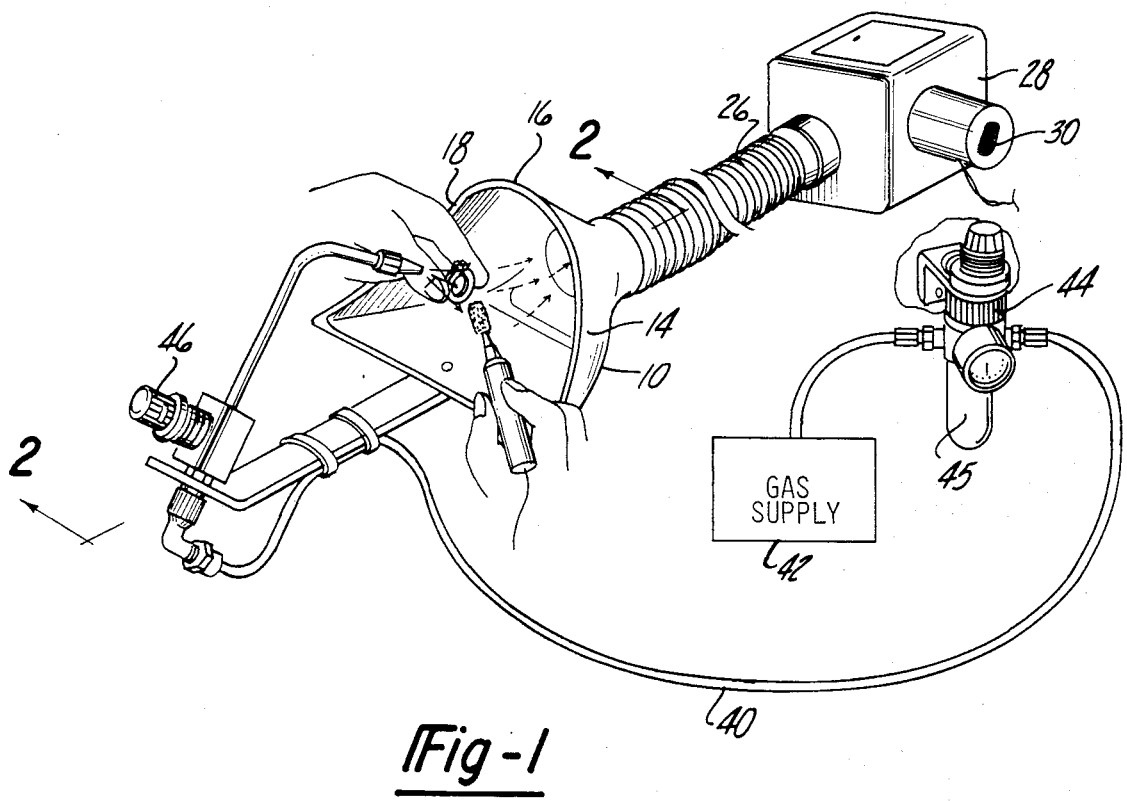
FIG. 1 is a perspective view illustrating a preferred embodiment of the present invention.

With reference first to FIG. 1, a preferred embodiment of the device of the present invention is thereshown for collecting debris from a grinding, polishing or other material removal operation and for also cooling the work. The grinding, polishing or other material operation will be hereinafter referred to collectively as a grinding operation.

Figure 2:
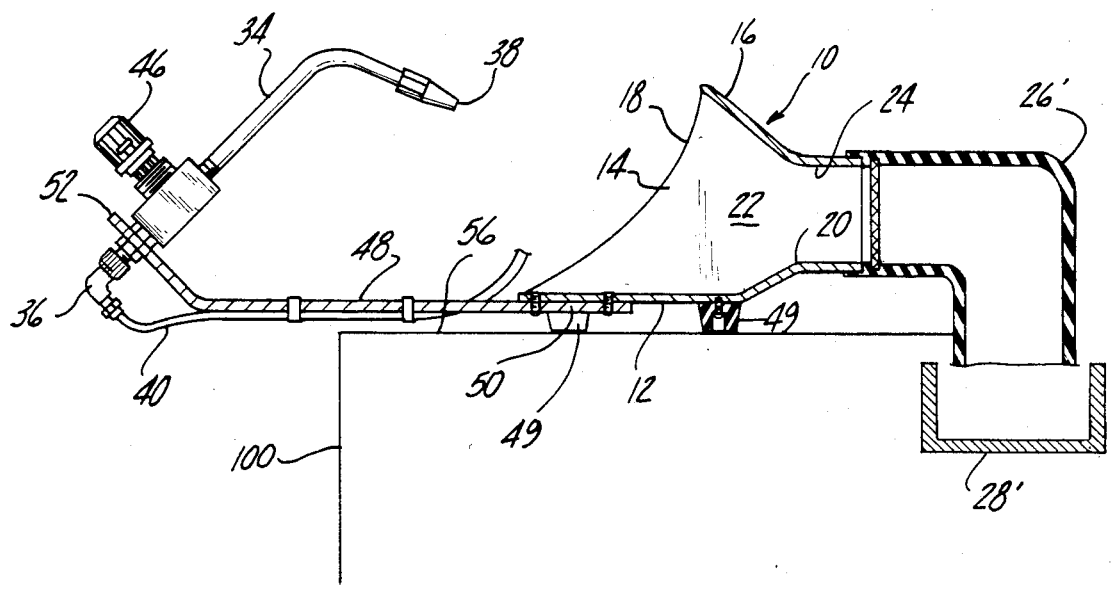
FIG. 2 is a sectional view taken along line 2—2 in FIG. 1 and also illustrating a modification to the invention.

With reference then to FIGS. 1 and 2, the device of the present invention comprises a scoop 10 having a relatively flat base wall 12, side walls 14 and a top wall 16. The walls 12, 14 and 16 taper towards each other from an open end 18 of the scoop 10 and to a base 20 of the scoop 10 and, in doing so, form a scoop chamber 22.

An outlet 24 in the base 16 is fluidly connected by a fluid conduit 26 to a debris collection container 28. In the embodiment of the invention shown in FIG. 1, the debris collection container 28 includes suction means 30 which inducts air from the outlet 24, through the fluid conduit 26 and to the container 28.

In a modified form of the invention shown in FIG. 2, the fluid conduit 26 is nonrestrictive and is open to a collection container 28' which is preferably positioned below the scoop 10. Unlike the embodiment shown in FIG. 1, the FIG. 2 embodiment does not include suction means 30 (FIG. 1).

As best shown in FIG. 2, the debris collection device of the present invention further comprises a gas nozzle 34 having an inlet 36 and an outlet 38. The inlet 36 is connected by a tube 40 to a source 42 (FIG. 1) of pressurized gas, such as nitrogen, oxygen or the like. Preferably, a pressure regulator 44 is connected in series with the tube 40 so that the pressure of the gas reaching the nozzle 34 can be regulated. In addition, a variable volume valve 46 is preferably connected in series with the tube 40 to thereby vary the volume of air flow through the nozzle 34. The pressure regulator 44 together with the valve 46 enables the volume of gas and its exit speed from the nozzle 34 to be varied in order to accommodate different grinding operations. In addition, the regulator 44 includes a filter 45 to remove moisture, oil, and other impurities from the gas stream.

An elongated bracket 48 has one end 50 secured to the bottom wall 12 of the scoop 10. The other end 52 of the bracket 50 is attached to and supports the gas nozzle 34. In addition, the nozzle 34 and bracket 48 are constructed so that the nozzle outlet 38 is spaced from the open end 18 of the scoop 10 and faces the outlet 24 in the scoop base 20. As shown in FIG. 2, the bracket 48 also allows the nozzle 34 to be positioned outwardly from an edge 100 of a work table 56.

A plurality of feet 49 on the scoop base wall 12 support the scoop 10 and nozzle 34 on the work table 56.

In operation, the vacuum or suction source 30, if available, is activated and, at the same time, the pressure regulator 44 is adjusted and the valve 46 is opened. In doing so, gas from the gas source 42 flows through the nozzle 34 and out its outlet end 38 towards the outlet 24 in the scoop base 20. When a grinding operation is then performed between the nozzle outlet 38 and the open end 18 of the scoop 10, the gas flow from the nozzle 34 directs debris from the grinding operation into the scoop 10 and through its outlet 24 and simultaneously cools the work. This debris is then removed to the debris collection container 28 or 28' for subsequent reclamation of the precious metals.

As shown in FIG. 2, in practice it has been found that the debris collection device of the present invention operates satisfactorily even without the suction means 30. In particular, it has been found that the gas flow through the nozzle 34 alone effectively forces the debris from the grinding oepration into the scoop outlet 24. The suction means 30 is desirable, however, when the fluid conduit 26 connecting the scoop 10 to the container 28 is relatively long.

From the foregoing, it can be seen that the present invention provides several advantages for collecting debris from a grinding operation, simultaneously cooling the work and which is particularly well suited for use in dental laboratories, jewelry manufacture shops and the like. In addition, the gas flow from the nozzle 34 cools metal debris so that such debris can be reclaimed and recycled. Furthermore, since the device of the present invention effectively removes all debris during the grinding operation, it keeps the work area free of harmful dust and debris thereby reducing pollution of the air surrounding the work area.

The device is also portable and can be easily moved to a comfortable position by the technician.

Having described my invention, however, many modifications thereto will become apparent to those skilled in the art to which it depends without deviation from the spirit of the invention as defined by the scope of the appended claims.

I claim:

1. A device for collecting debris from a material removal operation comprising
    a scoop having side walls, a top and a substantially flat base wall,
    said walls extending upwardly towards said top from the inner surface of said base wall thereby forming a scoop chamber, said scoop chamber being open at a front end and having an outlet at a rear end, said side walls, top and base wall extending between said front end and said outlet,
    means on the outer surface of said base wall for supporting said scoop on a flat surface,
    a debris collection container,
    a fluid conduit extending between said scoop chamber outlet and said debris collection container,
    a pressurized gas nozzle having an inlet and an outlet,
    a pressurized gas source,
    means for fluidly connecting said gas source to said nozzle inlet, and
    means for mounting said nozzle to said scoop so that said nozzle outlet is spaced from the front end of said scoop by a distance sufficient to allow a manual grinding operation to be performed between said nozzle and said scoop and so that said nozzle outlet faces said scoop chamber front end, said mounting means comprising an elongated bracket extending between the base wall of said scoop and said nozzle.

2. The invention as defined in claim 1 wherein said fluid connecting means comprises a pressure regulator in series between said pressurized gas source and said nozzle.

3. The invention as defined in claim 2 and comprising a variable volume gas valve in series between said pressurized gas source and said nozzle.

4. The invention as defined in claim 1 wherein said pressurized gas source comprises a pressurized nitrogen gas source.

5. The invention as defined in claim 1 wherein said pressurized gas source comprises a pressurized oxygen gas source.

6. The invention as defined in claim 1 and comprising means for creating a suction from said debris collection container, through said fluid conduit and to said scoop chamber outlet.

7. The invention as defined in claim 1 wherein said scoop side walls taper inwardly toward each other from said scoop front end and towards said scoop chamber outlet.

* * * * *